(12) United States Patent
Satou et al.

(10) Patent No.: US 7,045,735 B2
(45) Date of Patent: May 16, 2006

(54) MACHINING POWER SUPPLY FOR WIRE ELECTRICAL DISCHARGE MACHINE

(75) Inventors: Seiji Satou, Tokyo (JP); Hiroyuki Ooguro, Tokyo (JP); Hisashi Yamada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/492,592

(22) PCT Filed: Apr. 22, 2002

(86) PCT No.: PCT/JP02/03993

§ 371 (c)(1),
(2), (4) Date: Oct. 12, 2004

(87) PCT Pub. No.: WO03/089175

PCT Pub. Date: Oct. 30, 2003

(65) Prior Publication Data
US 2005/0051519 A1 Mar. 10, 2005

(51) Int. Cl.
B23H 1/02 (2006.01)

(52) U.S. Cl. .................. 219/69.18; 219/69.13

(58) Field of Classification Search ............ 219/69.12, 219/69.13, 69.18
See application file for complete search history.

(56) References Cited

U.S. PATENT DOCUMENTS

| 3,018,411 | A | * | 1/1962 | Webb ................. 219/69.18 |
| 3,892,936 | A | * | 7/1975 | Kobayashi et al. ...... 219/69.18 |
| 4,310,741 | A | * | 1/1982 | Inoue ................. 219/69.18 |
| 4,767,905 | A | * | 8/1988 | Inoue ................. 219/69.18 |
| 4,967,054 | A | * | 10/1990 | Obara et al. ........... 219/69.13 |
| 5,756,956 | A | | 5/1998 | Sato et al. |
| 5,872,347 | A | * | 2/1999 | Li et al. ............. 219/69.12 |
| 5,903,067 | A | * | 5/1999 | Sato et al. ........... 307/113 |
| 6,130,510 | A | * | 10/2000 | Kurihara et al. ........ 315/225 |

FOREIGN PATENT DOCUMENTS

| JP | 63-39725 A | * | 2/1988 |
| JP | 8-90342 A | | 4/1996 |
| JP | 8-118146 A | | 5/1996 |
| JP | 9-011043 A | | 1/1997 |
| JP | 11-48039 A | | 2/1999 |
| JP | 2001-105238 A | | 4/2001 |
| WO | WO 95/00277 A1 | | 1/1995 |

* cited by examiner

Primary Examiner—Geoffrey S. Evans
(74) Attorney, Agent, or Firm—Sughrue Mion, PLLC

(57) ABSTRACT

Machining electrical power supply device for wire electrical discharge machining. Includes an electrical discharge state distinguishing circuit (6) for distinguishing at least two inter-electrode states, including electrical shorting and normal electrical discharge, between a wire electrode (E) and a workpiece (W), and an inter-electrode current waveform control means for supplying, and for switching between supply of, a triangular wave and a trapezoidal wave current to the electrodes. According to the inter-electrode state distinguished by the electrical discharge state distinguishing circuit (6), in cases where the inter-electrode state is that of electrical shorting (Y1), the inter-electrode current waveform control means supplies a triangular wave current (I) to the electrodes, and in cases where the inter-electrode state is that of normal electrical discharge (Y3), it supplies a trapezoidal wave current (I) to the electrodes. Breakage of the wire electrode (E) can be avoided and machining speed can be improved.

11 Claims, 14 Drawing Sheets

1: power supply
2: power supply circuit

3: numerical control device
4: pulse width setting circuit
5: pulse stretcher circuit
6: electrical discharge state distinguishing circuit
8: first signal output circuit
9: second signal output circuit

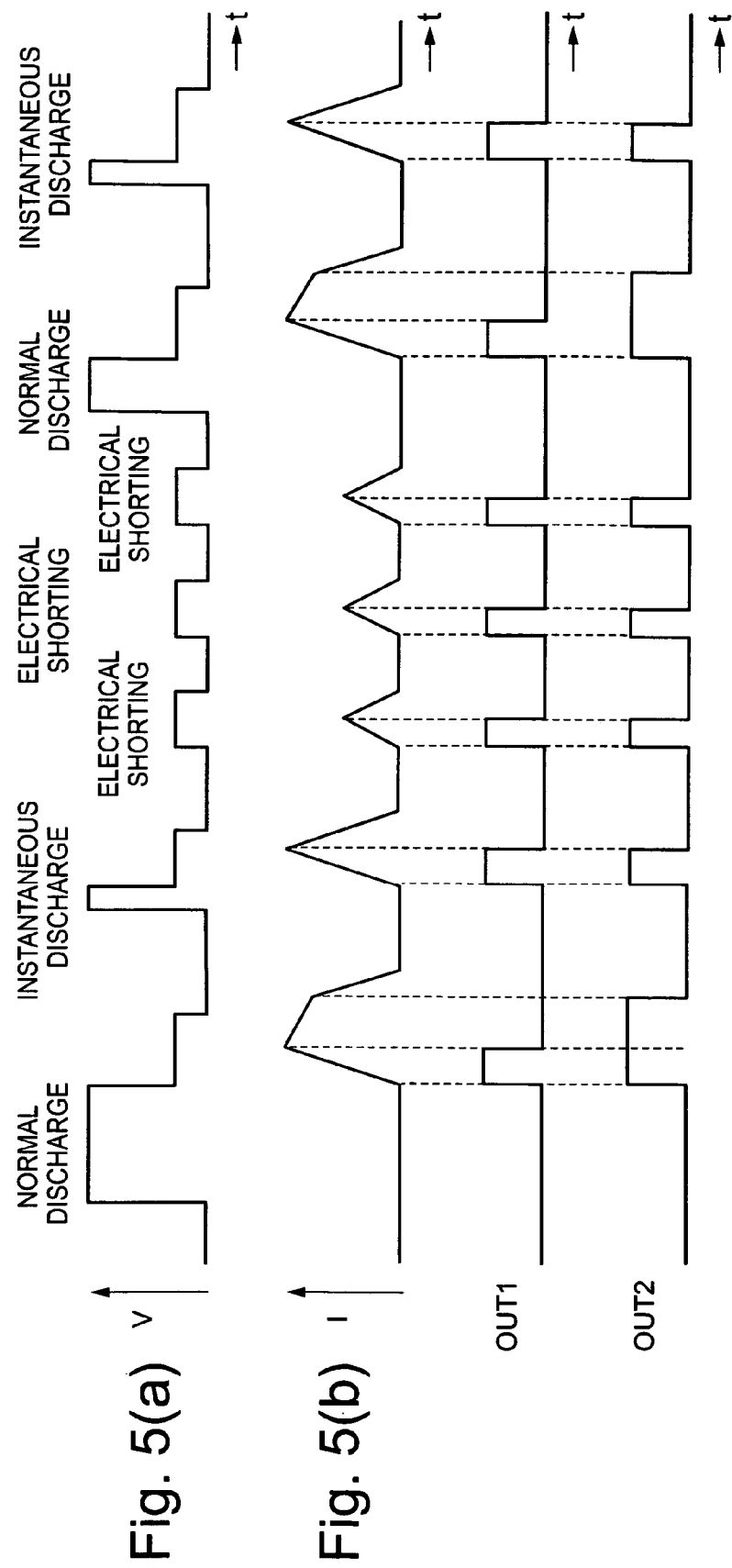

Fig. 6

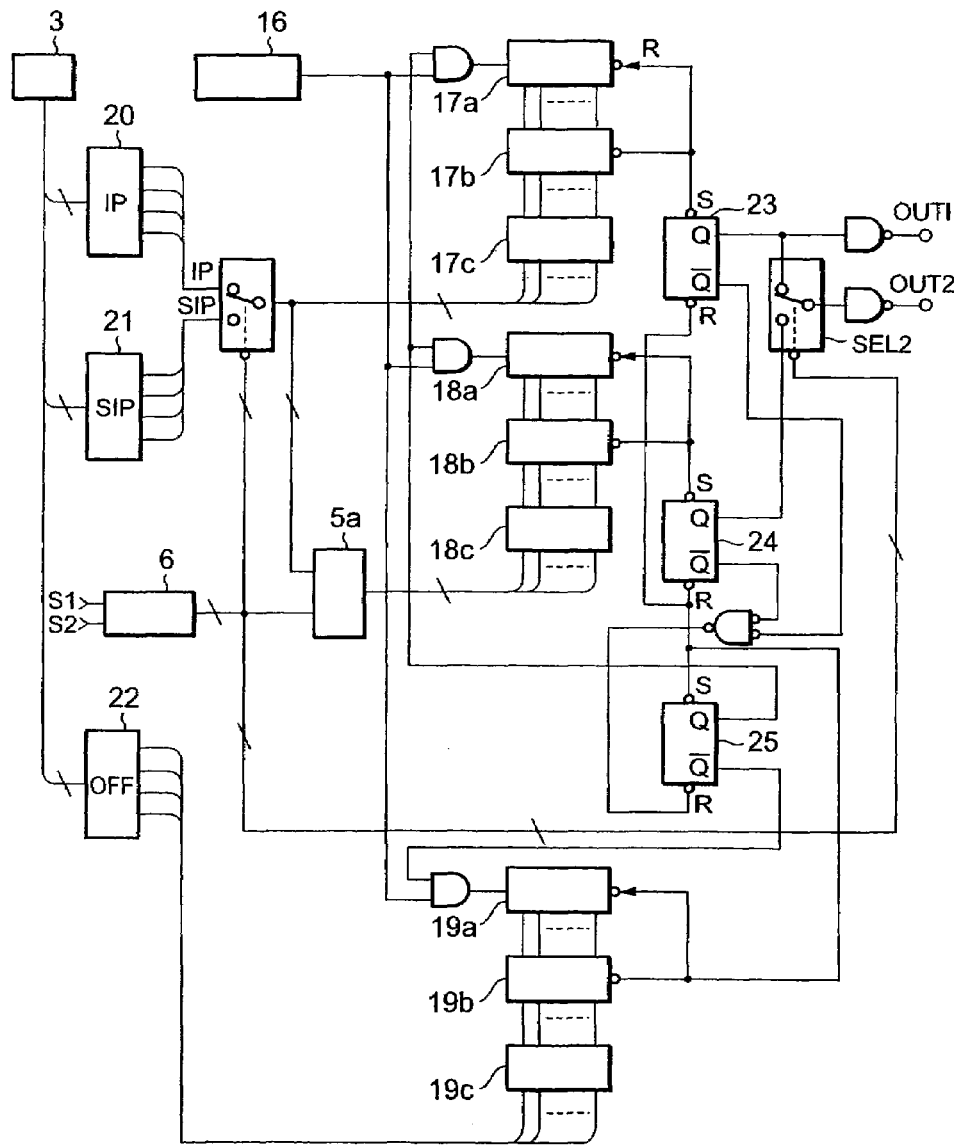

3: numerical control device
5a: pulse stretcher circuit
6: electrical discharge state distinguishing circuit
16: clock generator
17a: first counter
17b: first agreement comparator circuit
17c: first pulse width setting circuit
18a: second counter
18b: second agreement comparator circuit
18c: second pulse width setting circuit
19a: OFF counter
19b: OFF counter agreement comparator circuit
19c: OFF time setting circuit

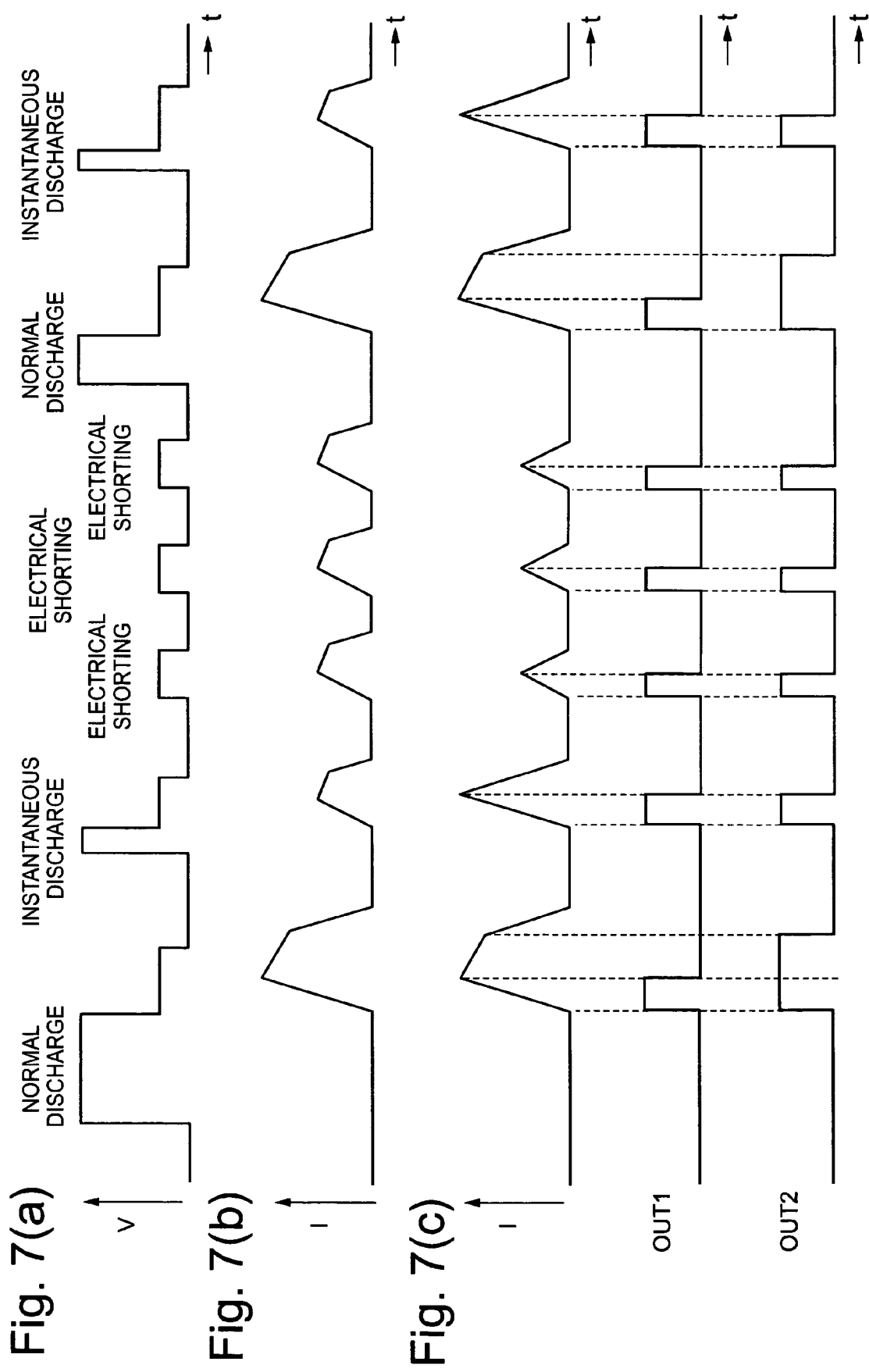

3: numerical control device
4: pulse width setting circuit
6: electrical discharge state distinguishing circuit
8: first signal output circuit
9: second signal output circuit
26: pulse stretcher range setting circuit
27: all wave forms output counter
28: trapezoidal wave output counter
29: reset circuit 3: numerical control device
4: pulse width setting circuit
6: electrical discharge state distinguishing circuit
8: first signal output circuit
9: second signal output circuit
26: pulse stretcher range setting circuit
27: all wave forms output counter
28: trapezoidal wave output counter
29: reset circuit
31: triangular wave output counter

Fig. 12

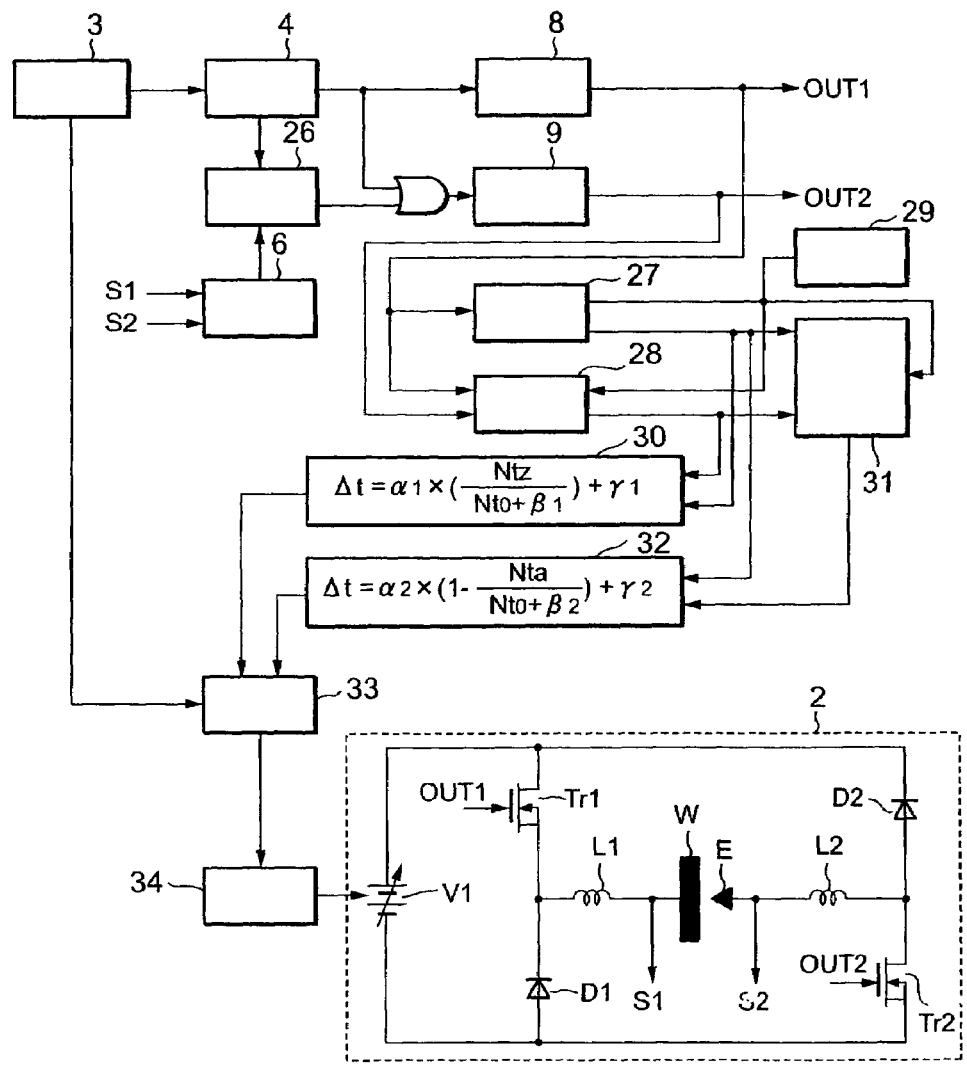

2: power supply circuit
3: numerical control device
4: pulse width setting circuit
6: electrical discharge state distinguishing circuit
8: first signal output circuit
9: second signal output circuit
26: pulse stretcher range setting circuit
27: all wave forms output counter
28: trapezoidal wave output counter
29: reset circuit
31: triangular wave output counter
33: signal selection circuit
34: voltage regulator circuit

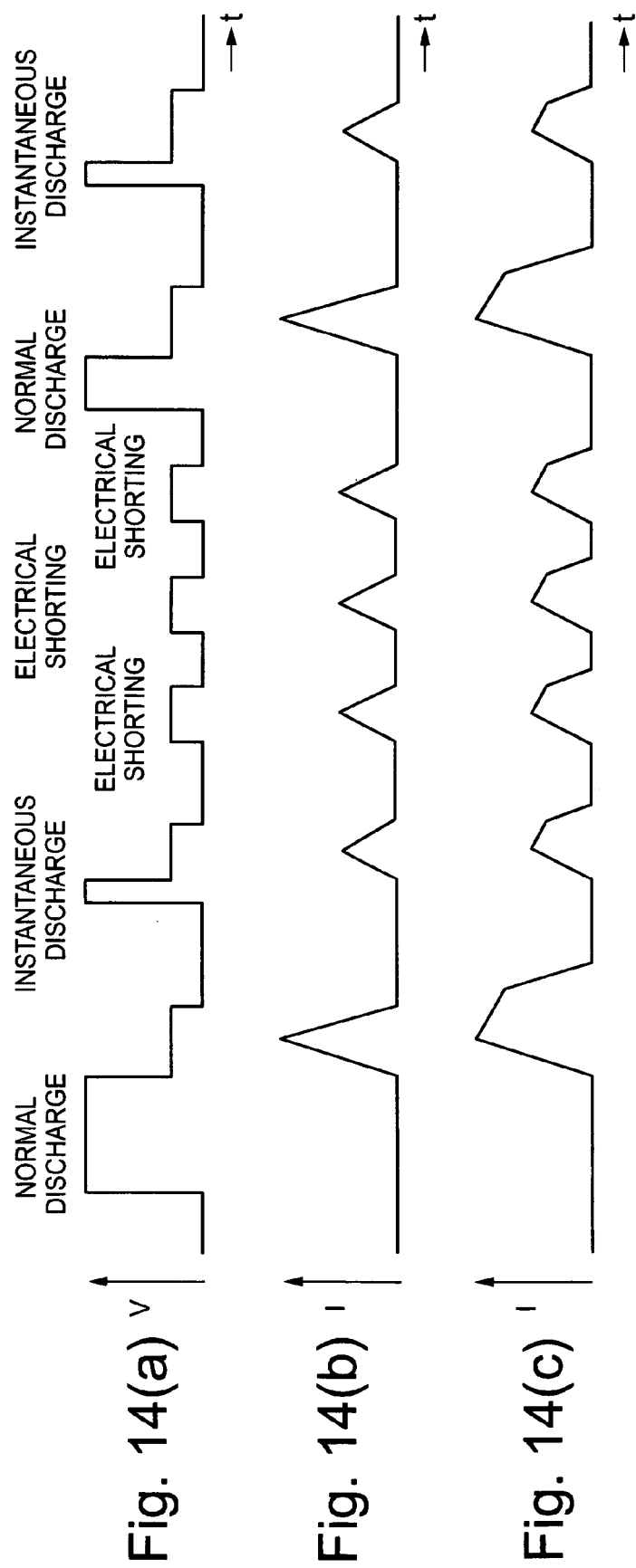

MACHINING POWER SUPPLY FOR WIRE ELECTRICAL DISCHARGE MACHINE

TECHNICAL FIELD

The present invention relates to improvement in machining electrical power supply devices used in wire electrical discharge machines that machine a workpiece by electrical discharge between a wire electrode and the workpiece.

BACKGROUND ART

In wire electrical discharge machining, insulating machining-fluid is put between a wire electrode and a workpiece as electrodes, and while the wire electrode and the workpiece are moved relative to one another, machining electrical power is supplied to the electrodes by a machining electrical power supply device, and the workpiece is machined by electrical discharge energy.

An example of this type of machining electrical power supply device in a conventional wire electrical discharge machine that uses wire electrical discharge machining is disclosed in Japanese Laid-Open Patent Publication 1996-118147. This machining electrical power supply device is provided with an electrical shorting distinguishing circuit for distinguishing an electrical shorting state between the electrodes, and, if an electrical shorting state is detected, it eliminates the electrical shorting state by applying to the electrodes an electrical current pulse with the minimum peak value necessary for eliminating the electrical shorting, to improve machining speed by avoiding breakage of the wire electrode.

With the machining electrical power supply device in this conventional wire electrical discharge machine, electrical current pulse peak values are set for each of normal, abnormal, and electrical shorting states, but the electrical current pulse waveform cannot be controlled according to the result of the distinguishing circuit. That is, the peak value of the current pulse supplied to the electrodes differs in accordance with the normal, the abnormal, and the electrical shorting inter-electrode conditions, but the waveform has a roughly similar shape.

FIG. 14 illustrates an example of the inter-electrode current waveform for the machining electrical power supply device in the conventional wire electrical discharge machine, and in the figure, V represents inter-electrode voltage, I represents inter-electrode current, and t represents time. Corresponding to the waveform of the inter-electrode voltage V of FIG. 14(a), the inter-electrode current I has roughly similarly shaped waveforms, as in FIGS. 14(b) and (c).

With the machining electrical power supply device in the conventional wire electrical discharge machine, even in the high-speed machining field, in which machining gaps are narrow, an energy change in the current pulse flowing to the electrodes in order to eliminate the electrical shorting merely controls changes in the peak values, as described above, and cannot perform fine energy control. When machining speed is increased in the high-speed machining field close to the breaking limit of the wire electrode, the controllable area for avoiding the breakage of the wire electrode becomes narrow, and thus the breakage limit of the wire electrode is easily exceeded, and since it is difficult to safely avoid the electrode wire breakage, ultimately there has been a problem in that the machining speed cannot be increased.

Further, in order to perform high-speed machining, the electrical load per current pulse must be made large in order to make the electrical discharge energy large; however, the higher the peak value of the inter-electrode current the more easily the wire electrode is broken, and with the conventional inter-electrode current waveform as in FIG. 14, in order to make the electrical discharge energy large, the area of the inter-electrode current waveform is made large, and the only way to do this is to raise the peak value; thus, there has been a problem in that it is not possible to improve the machining speed while inhibiting the breakage of the wire electrode.

In addition, because the frequency of electrical shorting increases in the high-speed machining field, the current pulse, which flows to the electrodes in order to eliminate electrical shorting, contributes to bridge elimination in electrical shorting members but not directly to the electrical discharge itself, and thus, in the high-speed machining field, there has been a problem in that electrical power that does not directly contribute to the machining increases.

DISCLOSURE OF INVENTION

The present invention is directed at solving these problems and has as an object the realization of a machining electrical power supply device for a wire electrical discharge machining apparatus, in which, even in the field of high-speed machining, wire electrode breakage can be avoided and machining speed can be improved.

The machining electrical power supply device for the wire electrical discharge machining apparatus related to this invention supplies machining power to a wire electrode and a workpiece as electrodes, the machining electrical power supply device for the wire electrical discharge machining apparatus that machines the workpiece by electrical discharge comprising: an electrical discharge state distinguishing circuit that distinguishes at least two inter-electrode states including electrical shorting and normal electrical discharge, and an inter-electrode current waveform control means for supplying, and for switching between supply of, triangular wave and trapezoidal wave currents to the electrodes, wherein, according to the inter-electrode state distinguished by the electrical discharge state distinguishing circuit, in cases where the inter-electrode state is that of the electrical shorting, the device supplies the triangular wave current to the electrodes by the inter-electrode current waveform control means, and in cases where the inter-electrode state is that of the normal electrical discharge, the device supplies the trapezoidal wave current to the electrodes by the inter-electrode current waveform control means.

Further, the machining electrical power supply device for the wire electrical discharge machining apparatus related to this invention supplies machining power between a wire electrode and a workpiece as electrodes, the machining electrical power supply device for the wire electrical discharge machining apparatus that machines the workpiece by electrical discharge comprising: an electrical discharge state distinguishing circuit that distinguishes electrical shorting, instantaneous electrical discharge, and normal electrical discharge inter-electrode states, and an inter-electrode current waveform control means for supplying, and for switching between supply of, triangular wave and trapezoidal wave currents to the electrodes, wherein, according to the inter-electrode state distinguished by the electrical discharge state distinguishing circuit, in cases where the inter-electrode state is that of the electrical shorting, the device supplies the triangular wave current to the electrodes by the inter-electrode current waveform control means, and in cases where the inter-electrode state is that of the normal electrical discharge, the device supplies the trapezoidal wave current to the electrodes by the inter-electrode current waveform control means, and in cases where the inter-electrode state is that of instantaneous electrical discharge, the device supplies the triangular wave or the trapezoidal wave current to the electrodes by the inter-electrode current waveform control means.

Further, the machining electrical power supply device for the wire electrical discharge machining apparatus related to this invention is provided with: a trapezoidal wave output counting means for counting the trapezoidal wave output count (Ntz) only, and an all-waveforms output counting means for counting all the trapezoidal wave and triangular wave output counts (Nto), wherein, in cases where the ratio (Ntz/Nto) is large, the inter-electrode current waveform control means increases the pulse width of the trapezoidal wave current supplied to the electrodes, and, in cases where the ratio (Ntz/Nto) is small, the inter-electrode current waveform control means decreases the pulse width of the trapezoidal wave current supplied to the electrodes.

Further, the machining electrical power supply device for the wire electrical discharge machining apparatus related to this invention is provided with: a triangular wave output counting means for counting the triangular wave output count (Nta) only, and an all-waveforms output counting means for counting all the trapezoidal wave and triangular wave output counts (Nto), wherein, in cases where the ratio (Nta/Nto) is small, the inter-electrode current waveform control means increases the pulse width of the trapezoidal wave current supplied to the electrodes, and, in cases where the ratio (Nta/Nto) is large, the inter-electrode current waveform control means decreases the pulse width of the trapezoidal wave current supplied to the electrodes.

Further, the machining electrical power supply device for a wire electrical discharge machining apparatus related to this invention is provided with: a trapezoidal wave output counting means for counting the trapezoidal wave output count (Ntz) only, and an all-waveforms output counting means for counting all the trapezoidal wave and triangular wave output counts (Nto), wherein, in cases where the ratio (Ntz/Nto) is large, the inter-electrode current waveform control means increases the peak value of the trapezoidal wave current supplied to the electrodes, and, in cases where the ratio (Ntz/Nto) is small, the inter-electrode current waveform control means decreases the peak value of the trapezoidal wave current supplied to the electrodes.

Further, the machining electrical power supply device for a wire electrical discharge machining apparatus related to this invention is provided with: a triangular wave output counting means for counting the triangular wave output count (Nta) only, and an all-waveforms output counting means for counting all the trapezoidal wave and triangular wave output counts (Nto), wherein, in cases where the ratio (Nta/Nto) is small, the inter-electrode current waveform control means increases the peak value of the trapezoidal wave current supplied to the electrodes, and, in cases where the ratio (Nta/Nto) is large, the inter-electrode current waveform control means decreases the peak value of the trapezoidal wave current supplied to the electrodes.

The machining electrical power supply device for a wire electrical discharge machining apparatus related to this invention, configured as above, has advantages in that wire electrode breakage can be avoided even in the high-speed machining field, and machining can be safely carried out. A further advantage is that machining speed can be improved.

BRIEF DESCRIPTION OF DRAWINGS

FIGS. 5(a) and 5(b) illustrates examples of an inter-electrode current waveform according to the machining electrical power supply device for the wire electrical discharge machining apparatus according to Embodiment 1 of this invention;.

FIG. 6 is a configuration diagram of the machining power control circuit 1 of the machining electrical power supply device for the wire electrical discharge machining apparatus related to Embodiment 2 of this invention;

FIGS. 7(a)–7(c) illustrates examples of the inter-electrode current waveform according to the machining electrical power supply device for the wire electrical discharge machining apparatus according to Embodiment 2 of this invention;

FIG. 12 is a configuration diagram of the machining electrical power supply device for the wire electrical discharge machining apparatus according to Embodiment 5 of this invention;

FIGS. 14(a)–14(c) illustrates are examples of an inter-electrode current wave form according to a conventional machining electrical power supply device for a wire electrical discharge machining apparatus.

BEST MODE FOR CARRYING OUT THE INVENTION

Embodiment 1.

Figure 1:
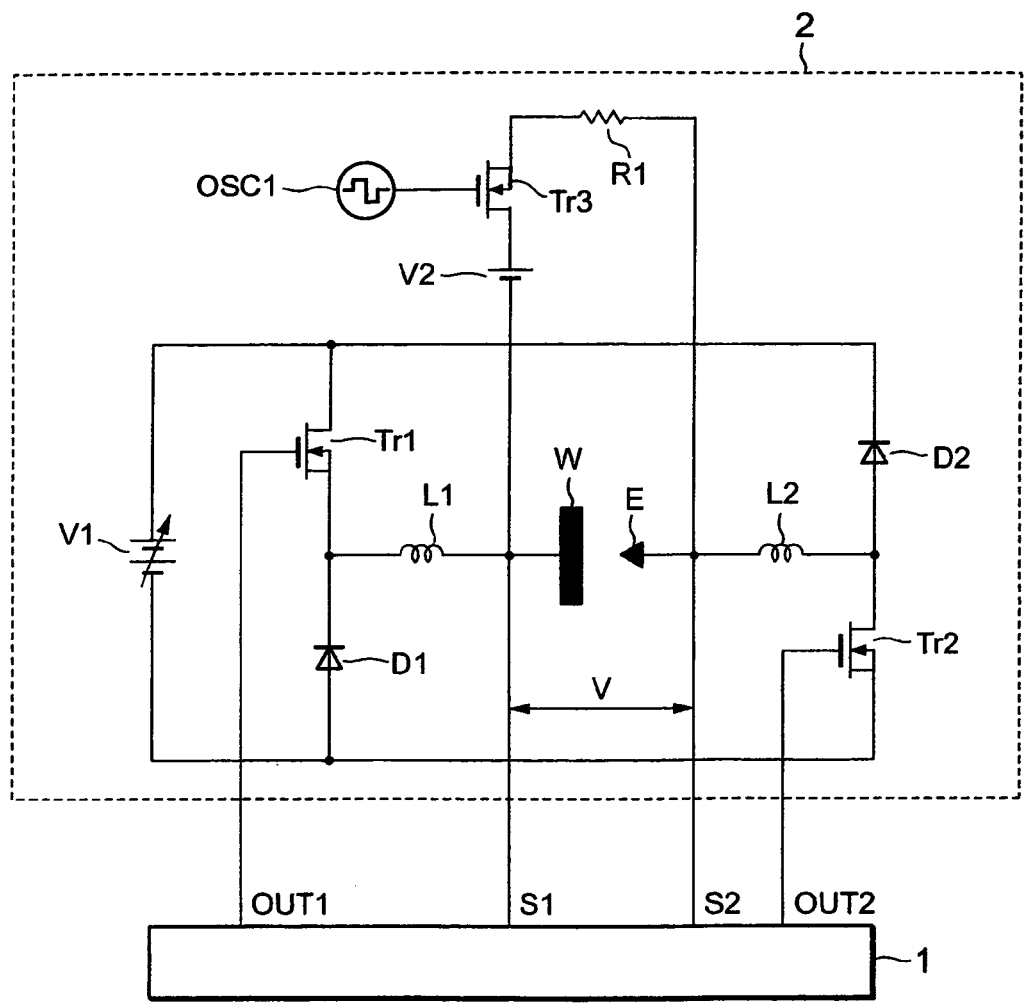
FIG. 1 is a configuration diagram of a machining electrical power supply device for a wire electrical discharge machining apparatus related to Embodiment 1 of this invention.

FIG. 1 is a configuration diagram of a machining electrical power supply device for a wire electrical discharge machining apparatus related to Embodiment 1 of this invention. In the figure, reference numeral 1 is a machining electrical power supply control circuit, 2 is a machining electrical power supply circuit, E is a wire electrode, W is a workpiece, V represents inter-electrode voltage between the wire electrode E and the workpiece W, OSC1 is an oscillator, Tr1 is a switching element that performs ON-OFF operations by means of a drive signal OUT1 output from the machining power supply control circuit 1, Tr2 is a switching element that performs ON-OFF operations by means of a drive signal OUT2 output from the machining power supply control circuit 1, Tr3 is a switching element that performs ON-OFF operations by means of an oscillation signal output from the oscillator OSC1, V1 is a variable-voltage direct current power supply, V2 is a direct current power supply, R1 is a resistor, D1 and D2 are diodes, S1 and S2 are detection input terminals, and L1 and L2 are floating inductances included in electrical supply lines and circuits.

Figure 2:
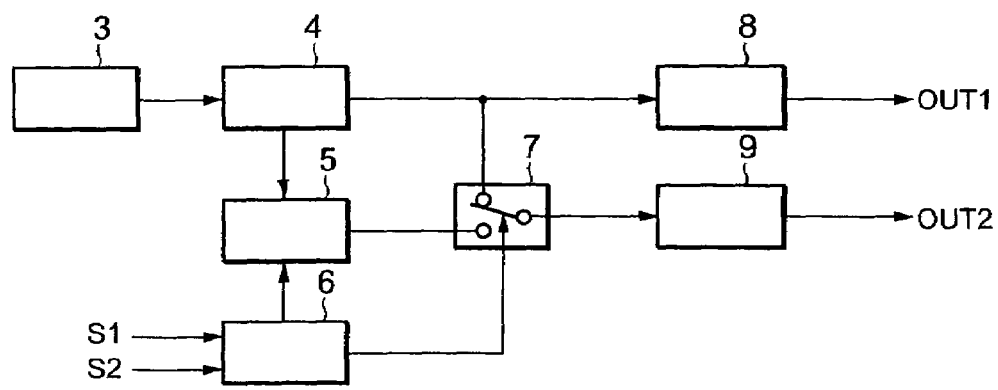
FIG. 2 is a configuration diagram of a machining power supply control circuit 1 of the machining electrical power supply device for the wire electrical discharge machining apparatus related to Embodiment 1 of this invention.

FIG. 2 is a configuration diagram of the machining power supply control circuit 1 of the machining electrical power supply device for the wire electrical discharge machining apparatus related to Embodiment 1 of this invention. Numerical references identical to FIG. 1 illustrate identical or equivalent parts. In FIG. 2, reference numeral 3 is a numerical control device, 4 is a pulse width setting circuit, 5 is a pulse stretcher circuit that extends the pulse width set by the pulse width setting circuit 4, 6 is an electrical discharge state distinguishing circuit, 7 is a selecting circuit that selects, according to output results of the electrical discharge state distinguishing circuit 6, output from the pulse width setting circuit 4 and output from the pulse stretcher circuit 5, 8 is a first signal output circuit that outputs an ON-OFF operation drive signal OUT1 of the switching element Tr1 for the pulse width set in the pulse width setting circuit 4, 9 is a second signal output circuit that outputs an ON-OFF operation drive signal OUT2 of the switching element Tr2 for the pulse width selected by the selection circuit 7.

Figure 3:
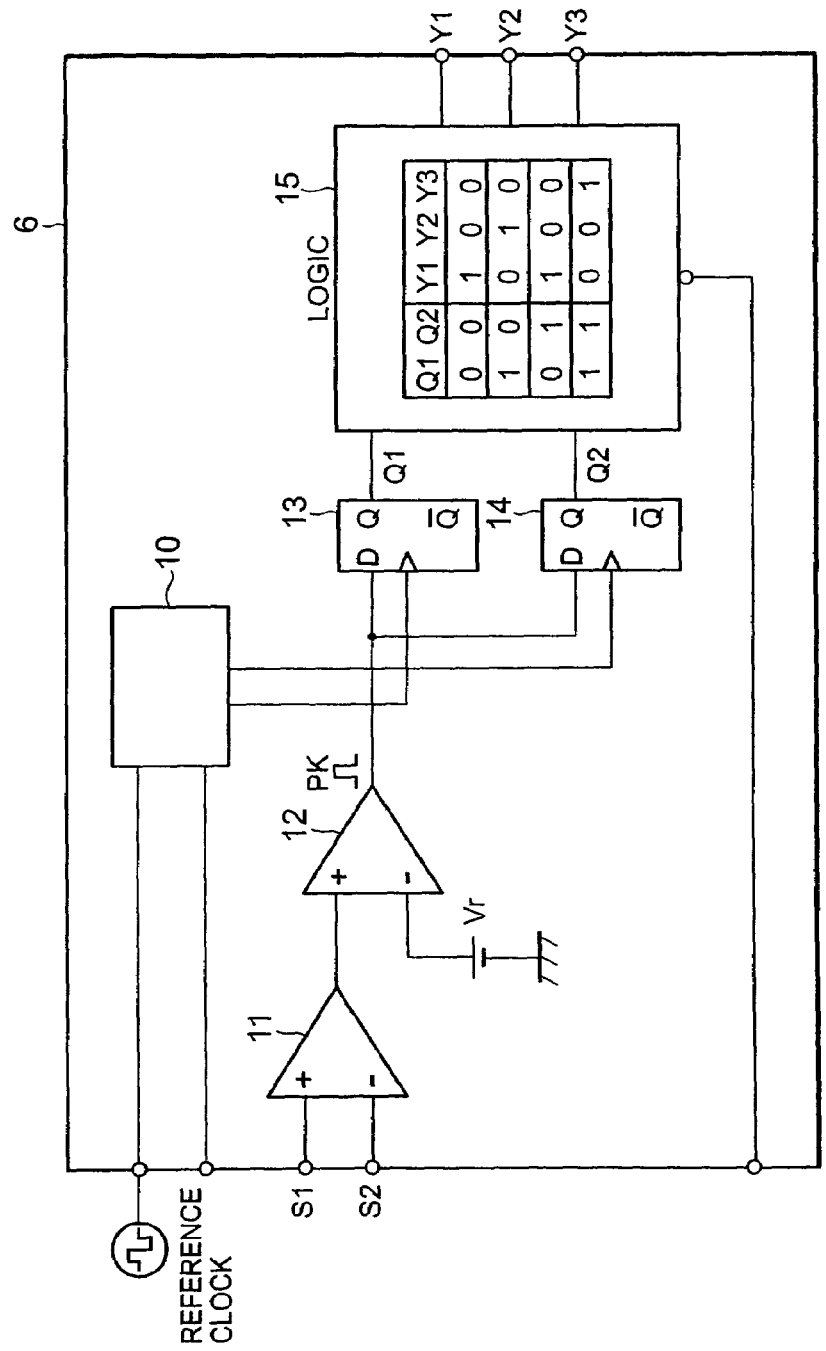
FIG. 3 is a configuration diagram of an electrical discharge state distinguishing circuit 6 of FIG. 2.

FIG. 3 is a configuration diagram of the electrical discharge state distinguishing circuit 6 of FIG. 2. In FIG. 3, numerical reference 10 is a counter, 11 is an amplifier that inputs a signal from the detection input terminals S1 and S2, 12 is a comparator that compares output from the amplifier 11 and a reference voltage Vr, 13 and 14 are D-type flip-flops, and 15 is an arithmetic-logic circuit.

Figure 4:
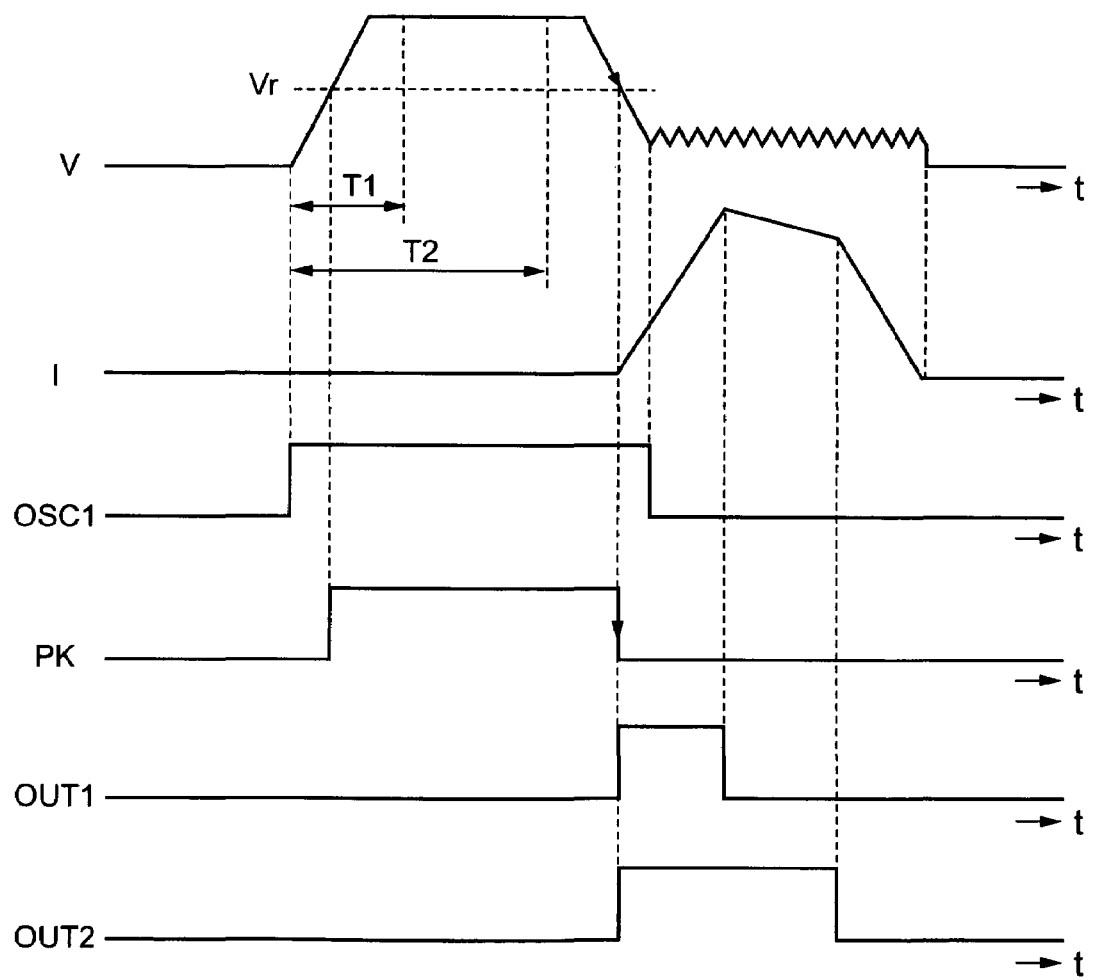
FIG. 4 is an explanatory diagram of waveform control for an inter-electrode current I based on an electrical discharge distinguishing result by the electrical discharge state distinguishing circuit 6.

Operations are now explained. When the switching element Tr3 of FIG. 1 is switched to ON by an oscillation signal of the oscillator OSC1, a voltage due to the direct current power supply V2 occurs between the wire electrode E and the workpiece W as electrodes, and the inter-electrode voltage V is, for example, as in FIG. 4. At this time, the amplifier 11 of FIG. 3 detects the inter-electrode voltage V by the detection input terminals S1 and S2, and because the comparator 12 compares the inter-electrode voltage V with the reference voltage Vr and outputs a pulse signal PK, this pulse signal PK takes the waveform illustrated in FIG. 4. Meanwhile, the counter 10 of FIG. 3 performs a counting operation at, for example, a clock frequency of 10 MHz, and thus, when a period of time T1 has elapsed or when a period of time T2 has elapsed after the oscillator OSC1 outputs an ON signal to the switching element Tr3, a trigger signal is output. The D-type flip-flop 13 outputs as a signal Q1 the state of the pulse signal PK that is the output of the comparator 12 at the point in time when the period T1 has elapsed. Further, the D-type flip-flop 14 outputs as a signal Q2 the state of the pulse signal PK that is the output of the comparator 12 at the point in time when the period T2 has elapsed. The arithmetic-logic circuit 15 judges whether the inter-electrode voltage V, at the point in time when the period T1 has elapsed, has risen as far as the reference voltage Vr, and whether the inter-electrode voltage V, at the point in time when the period T2 has elapsed, has risen as far as the reference voltage Vr, and distinguishes whether the inter-electrode is in a state of electrical shorting, instantaneous electrical discharge, or normal electrical discharge. For example, after commencing application of the voltage, at a point in time after the period T1 has elapsed, at which the inter-electrode voltage should have risen to the reference voltage Vr, if the inter-electrode voltage has not risen to the reference voltage Vr, the inter-electrode state is judged to be that of the electrical shorting (Y1); at a point in time after the period T1 has elapsed, if the inter-electrode voltage has risen to the reference voltage Vr and, up to a point in time at the end of the subsequent period T2, electrical discharge occurs, the judgment is that of the instantaneous electrical discharge (Y2); and, at a point in time after the period T2 has elapsed, if the inter-electrode voltage has risen to the reference voltage Vr, and after that, electrical discharge occurs stably over a sufficient time period, the judgment is that of the normal electrical discharge (Y3).

As outlined above, by means of the electrical discharge state distinguishing circuit 6, a judgment can be made as to whether the electrical shorting, the instantaneous electrical discharge, or the normal electrical discharge is occurring.

The size of the inter-electrode current output when an electrical discharge occurs can be set in advance to an optional value in the numerical control device 3 of FIG. 2. By this prescribed value, the time, for which the switching element Tr1 is set to ON and operates, is fixed in the pulse width setting circuit 4. The first signal output circuit 8 outputs the drive signal OUT1 so as to set to ON and operate the switching element Tr1 in only the pulse width set in the pulse width setting circuit 4. Meanwhile, in the pulse stretcher circuit 5, the pulse width set in the pulse width setting circuit 4 is extended a certain period in a one-shot multi-vibrator or the like. At this time, where the output result of the electrical discharge state distinguishing circuit 6 is that of the normal electrical discharge, the selecting circuit 7 selects the pulse signal extended in the pulse stretcher circuit 5 as input for the second signal output circuit 9. The second signal output circuit 9 outputs the drive signal OUT2 so as to set to ON and to operate the switching element Tr2 in only the pulse width extended in the pulse stretcher circuit 5. Where the output result of the electrical discharge state distinguishing circuit 6 is that of the electrical shorting, the selecting circuit 7 selects the pulse signal set in the pulse width setting circuit 4 as it is, as input for the second signal output circuit 9. The second signal output circuit 9 outputs the drive signal OUT2 so as to set to ON and to operate the switching element Tr2 without extending the pulse width set in the pulse width setting circuit 4.

As illustrated in FIG. 5, where the pulse widths of the drive signal OUT1 and the drive signal OUT2 are the same, that is, where the ON times of the switching elements Tr1 and Tr2 are the same, a triangular wave electrical current is output, and where the drive signal OUT2 is extended and the ON time alone of the switching element Tr2 is longer, a trapezoidal wave electrical current is output. In this way, an inter-electrode electrical current waveform control means can be configured that supplies the triangular wave and the trapezoidal wave electrical currents, and switches between these currents, to the wire electrode and the workpiece as electrodes.

As in FIG. 5, if the inter-electrode state is that of the electrical shorting, a low-power triangular wave is output, and if the inter-electrode state is that of the normal electrical discharge, a high-power trapezoidal wave is output.

Further, if the inter-electrode state is that of the instantaneous electrical discharge, it may be decided in advance whether the selecting circuit 7 operates as though assuming the electrical shorting, or operates as though assuming the normal electrical discharge.

Embodiment 2

FIG. 6 is a configuration diagram of the machining power control circuit 1 of the machining electrical power supply device for the wire electrical discharge machining apparatus related to Embodiment 2 of this invention, and the machining electrical power supply circuit 2 is similar to FIG. 1 of Embodiment 1.

In FIG. 6, reference numeral 3 is a numerical control device, 5a is a pulse stretcher circuit, 6 is an electrical discharge state distinguishing circuit, 16 is a clock generator, 17a is a first counter, 17b is a first pulse agreement comparator circuit, 17c is a first pulse width setting circuit, 18a is a second counter, 18b is a second agreement comparator circuit, 18c is a second pulse width setting circuit, 19a is an OFF counter, 19b is an OFF counter agreement comparator circuit, 19c is an OFF time setting circuit, 20, 21 and 22 are latches, 23, 24 and 25 are flip-flops, OUT1 is an ON-OFF operator drive signal for a switching element Tr1 of the machining electrical power supply circuit 2, OUT2 is an ON-OFF operator drive signal for a switching element Tr2 of the machining electrical power supply circuit 2, and SEL1 and SEL2 are switches.

In FIG. 6, the clock generator 16 supplies a clock pulse of, for example, a frequency of 10 MHz to the first counter 17a, the second counter 18a, and the OFF counter 19a. The first counter 17a, the second counter 18a, and the OFF counter 19a count, by means of the first pulse agreement comparator circuit 17b, the second pulse agreement comparator circuit 18b, and the OFF counter agreement comparator circuit 19b, the clock pulse of the clock generator 16, until each counted value is in agreement with the corresponding set values set in the first pulse width setting circuit 17c, the second pulse width setting circuit 18c, and the OFF time setting circuit 19c.

Latches 20, 21 and 22 hold IP output, SIP output, and intermission time output, respectively, from the numerical control device 3. Here, the IP output is a value set by the numerical control device 3 as the ON time of a large electrical current pulse supplied during the normal electrical discharge; the SIP output is similarly a value set as the ON time of a small electrical current pulse supplied during the abnormal or the electrical shorting electrical discharges. Further, the intermission time output is a value set by the numerical control device 3 as the OFF time between these electrical pulses.

The first pulse width setting circuit 17c is connected via the switch SEL1 to the output of the latch 20 or 21, the second pulse width setting circuit 18c is similarly connected via the pulse stretcher circuit 5a and the switch SEL1 to the output of the latch 20 or 21, and the OFF time range setting circuit 19c is connected to the output of the latch 22.

The flip-flop 25 is an R-S flip-flop for switching states of the pulse width and intermission time, and is connected so as to be set at the end of an intermission and to be reset at the end of a pulse, and it indicates an output Q=1 during pulse output and an output Q=0 during intermission.

The operation of the first counter 17a, the second counter 18a, and the OFF counter 19a are switched according to the output of the flip-flop 25. The flip-flop 23 is an R-S flip-flop for indicating that the first pulse is outputting, the flip-flop 24 is an R-S flip-flop for indicating that the second pulse is outputting, and each are set by the first pulse agreement comparator circuit 17b and the second pulse agreement comparator circuit 18b, and are both reset at the end of intermission.

Based on the output of the flip-flop 23, the ON time range of a triangular wave current pulse is decided; based on output of the flip-flop 24, the ON time range of the switching element when a trapezoidal wave current pulse is flowing is decided; and these are output as the ON-OFF operation drive signal OUT1 of the switching element Tr1 of the machining power supply circuit 2 of FIG. 1, and as the ON-OFF operation drive signal OUT2 of the switching element Tr2.

The switch SEL2 is a switch for selecting whether to deliver a triangular wave current or a trapezoidal wave current as the inter-electrode current pulse, and the switching operation is controlled according to output of the electrical discharge state distinguishing circuit 6. The electrical discharge state distinguishing circuit 6 detects and distinguishes the inter-electrode state as input to the detection input terminals S1 and S2, similarly to FIG. 3 of Embodiment 1.

The pulse stretcher circuit 5a is a digital converter for multiplying output from the latch 20 or 21 by, for example, a constant k (k>1), and for passing it to the second pulse width setting circuit 18c, and may comprise, for example, a ROM.

Since the latches 20 and 21 are independent, the IP output and SIP output from the numerical control device 3 may clearly be set as different values, for example with IP>SIP. That is, the set values of the pulse widths may have two types, large and small.

The switch SEL1 is controlled according to the output from the electrical discharge state distinguishing circuit 6, and, for example, where the electrical discharge distinguishing circuit 6 has the Y1 output (electrical shorting) or the Y2 output (instantaneous electrical discharge) it selects the SIP side, and where the output is Y3 (normal electrical discharge) only, it selects the IP side. Therefore, the pulse width with the electrical shorting or the instantaneous electrical discharge is shorter than the pulse width with the normal electrical discharge.

The switch SEL2 is also controlled according to the output from the electrical discharge state distinguishing circuit 6, and, for example, where the electrical discharge distinguishing circuit 6 has the Y1 output (electrical shorting) only, it selects the triangular wave, and where the electrical discharge state distinguishing circuit 6 has the Y2 output (instantaneous electrical discharge) or the Y3 output (normal electrical discharge), it selects the trapezoidal wave. Therefore, the triangular wave is output only when the inter-electrode state is that of the electrical shorting, and the trapezoidal wave is output when the inter-electrode state is that of the instantaneous electrical discharge or the normal electrical discharge. In this way, the inter-electrode current waveform control means can be configured to be able to supply, and to switch between, the triangular wave or the trapezoidal wave currents to the wire electrode and the workpiece as electrodes.

As a result, three types of waveform are output in accordance with the inter-electrode state: the trapezoidal wave with a large pulse width where the inter-electrode state is that of the normal electrical discharge, the trapezoidal wave with a small pulse width where the inter-electrode state is that of the instantaneous discharge, and a triangular wave with a small pulse width for the electrical shorting. That is, the inter-electrode current waveform is as in FIG. 7(b).

Further, by arranging that, when the electrical discharge state distinguishing circuit 6 output is Y1 (electrical shorting) only, the switch SEL1 selects the SIP side, and when the output is Y2 (instantaneous electrical discharge) or the output is Y3 (normal electrical discharge), it selects the IP side, and by arranging, when the electrical discharge state distinguishing circuit 6 output is Y3 (normal electrical discharge) only, that the switch SEL2 selects the trapezoidal wave, and when the electrical discharge state distinguishing circuit 6 output is Y1 (electrical shorting) or Y2 (instantaneous electrical discharge), that it selects the triangular wave, combinations of three types of waveform different to that described above—a large pulse width trapezoidal wave with the normal electrical discharge, a large pulse width triangular wave with the instantaneous electrical discharge, and a small pulse width triangular wave with the electrical shorting—are output in accordance with the inter-electrode state. In this way, the inter-electrode current waveform control means may be configured to be able to supply, and to switch between, the triangular wave and the trapezoidal wave currents to the wire electrode and the workpiece as electrodes. That is, in these cases, the inter-electrode current waveforms are as in FIG. 7(c).

Embodiment 3

Figure 8:
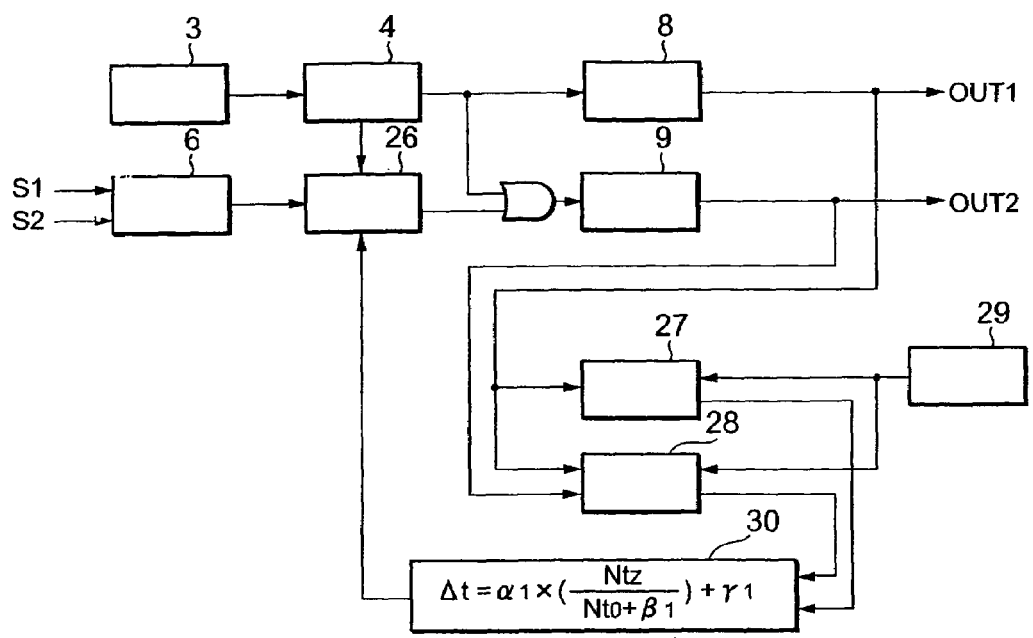
FIG. 8 is a configuration diagram of the machining power control circuit 1 of the machining electrical power supply device for the wire electrical discharge machining apparatus according to Embodiment 3 of this invention.

FIG. 8 is a configuration diagram of the machining electrical power supply control circuit 1 of the machining electrical power supply device for the wire electrical discharge machining apparatus according to Embodiment 3 of this invention, and the machining electrical power supply circuit 2 is similar to FIG. 1 of Embodiment 1. Further, numerical references identical to FIG. 2 of Embodiment 1 indicate identical or equivalent parts.

In FIG. 8, numerical reference 26 is a pulse stretcher range setting circuit, 27 is an all-waveforms output counter means for counting the output count of all waveforms, 28 is a trapezoidal wave output counter means for counting the output count of trapezoidal waves only, 29 is a reset circuit for resetting counter values at an optional cycle, 30 is a counting circuit for performing calculations according to the output of the all-waveforms output counter means 27 and the trapezoidal wave output counter means 28.

OUT1—the output signal of the first signal output circuit 8, and the ON-OFF operation driver signal of the switching element Tr1 of the machining electrical power supply circuit 2—is output without regard to triangular waves or trapezoidal waves when a current pulse is output to the electrodes, and thus, by counting this signal by the all-waveforms output counter means 27, it is possible to know the output count for all waveforms, triangular and trapezoidal. With OUT2—the output signal of the second signal output circuit 9, and the ON-OFF operation driver signal of the switching element Tr2 of the machining electrical power supply circuit 2—a signal is output with a pulse width longer than OUT1 only for cases of trapezoidal waves, and thus, by logical computation of the output signals OUT1 and OUT2, and by counting by means of the trapezoidal wave output counter means 28, it is possible to know the output count of the trapezoidal wave only.

Further, since these count values are accumulated according as the electrical discharge time passes, the count numerical value is reset at an optional cycle in the reset circuit 29. Since a current pulse of the order of 50 kHz is output in actual electrical discharge machining with rough machining, if a reset cycle of, for example, 2 ms is set, counting by the counter is performed every 100 pulses of the current.

By the output results of the all-waveforms output counter means 27 and the trapezoidal wave output counter means 28, if the pulse stretcher range is $\Delta t$, the all-waveforms output count is Nto, and the trapezoidal output count is Ntz, then the counting circuit 30 performs the following computational equation:

$$\Delta t = \alpha 1 \times \{Ntz/(Nto+\beta 1)\} + \gamma 1 \tag{1}$$

Figure 9A:
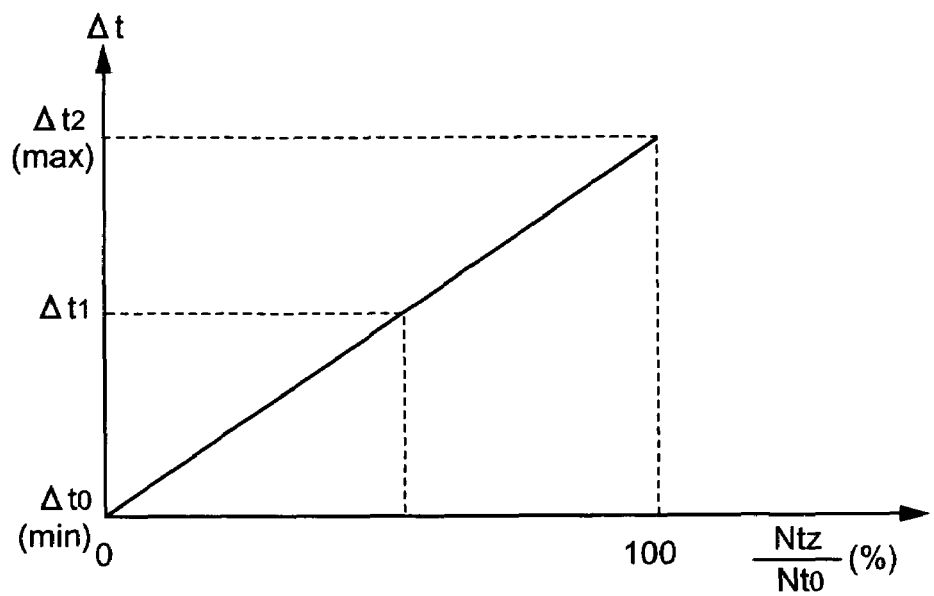
FIGS. 9(a) and 9(b) are explanatory diagrams of the waveform control for the inter-electrode current I for the machining electrical power supply device for the wire electrical discharge machining apparatus according to Embodiment 3 of this invention.

Here, $\alpha 1$ is a given constant, $\beta 1$ and $\gamma 1$ are constants used, directly after commencing machining, or directly after resetting the counting and the like, for compensation when the counter numerical values are 0 or close to 0. For example, for cases where the constant $\beta 1=0$ and the constant $\gamma 1=0$, the pulse stretcher range $\Delta t$ is proportional to the output ratio (Ntz/Nto) of the trapezoidal wave versus the all-waveforms, and it transforms as illustrated in FIG. 9(a).

The pulse stretcher range setting circuit 26 receives the output result from the electrical discharge state distinguishing circuit 6, and judges whether to make the trapezoidal wave or to make the triangular wave, and decides the pulse stretcher range $\Delta t$ for cases of the trapezoidal wave, according to the output result of the counting circuit 30.

Figure 9B:
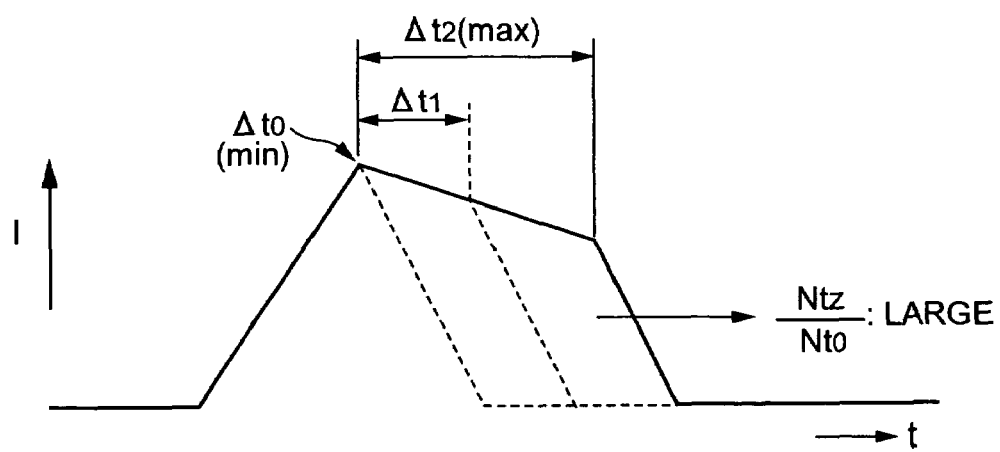

That is, where the proportion of the trapezoidal waves is large, since the machining state is stable with little electrical shorting even with a high power current pulse, the pulse stretcher range $\Delta t$ approaches a maximum value $\Delta t2$ (for example, 1 µs), and when the proportion of the trapezoidal waves is small, since the machining state is unstable due to the occurrence of much electrical shorting, the pulse stretcher range $\Delta t$ approaches a minimum value $\Delta t0$ (for example, 0 µs), and the waveform of the inter-electrode current I is controlled as in FIG. 9(b).

In this way, the inter-electrode current waveform control means can be configured to make the pulse width of the trapezoidal wave current supplied to the electrodes large when the ratio (Ntz/Nto) is large, and to make the pulse width of the trapezoidal wave current supplied to the electrodes small when the ratio (Ntz/Nto) is small.

Embodiment 4

Figure 10:
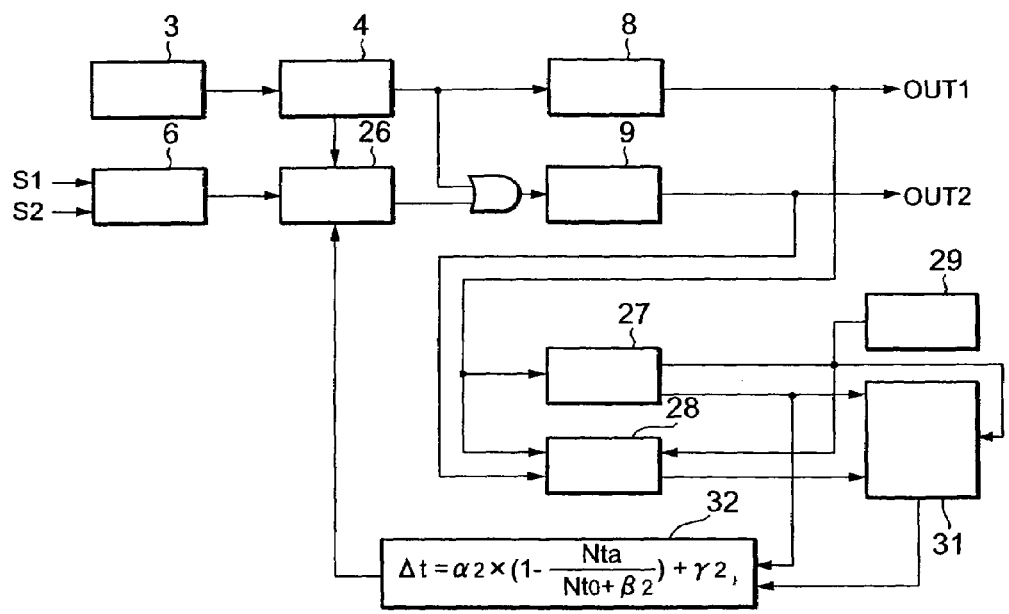
FIG. 10 is a configuration diagram of the machining power control circuit 1 of the machining electrical power supply device for the wire electrical discharge machining apparatus according to Embodiment 4 of this invention.

FIG. 10 is a configuration diagram of the machining electrical power supply control circuit 1 of the machining electrical power supply device for the wire electrical discharge machining apparatus according to Embodiment 4 of this invention, and the machining electrical power supply circuit 2 is similar to FIG. 1 of Embodiment 1. Further, numerical references identical to FIG. 8 of Embodiment 3 illustrate identical or equivalent parts. In FIG. 10, reference numeral 31 is a triangular wave output counter means for counting the triangular wave output count only, 32 is a computation circuit for carrying out computations according to the output of the all-waveforms output counter means 27 and the triangular wave output counter means 31.

By calculating the all-waveforms output-count that is output from the all-waveforms output-count means 27 and the trapezoidal-wave-only output-count that is output from the trapezoidal wave output-count means 28, the output count of the triangular-wave-only can be known, and this is counted in the triangular wave output count means 31.

By means of the output results of the all-waveforms output count means 27 and the triangular wave output count means 31, if the pulse stretcher range is Δt, the all-waveforms output count is Nto, and the triangular wave output count is Nta, the computation circuit 32 performs the following computation:

$$\Delta t = \alpha 2 \times \{1 - Ntz/(Nto + \beta 2)\} + \gamma 2 \quad (2)$$

Figure 11A:
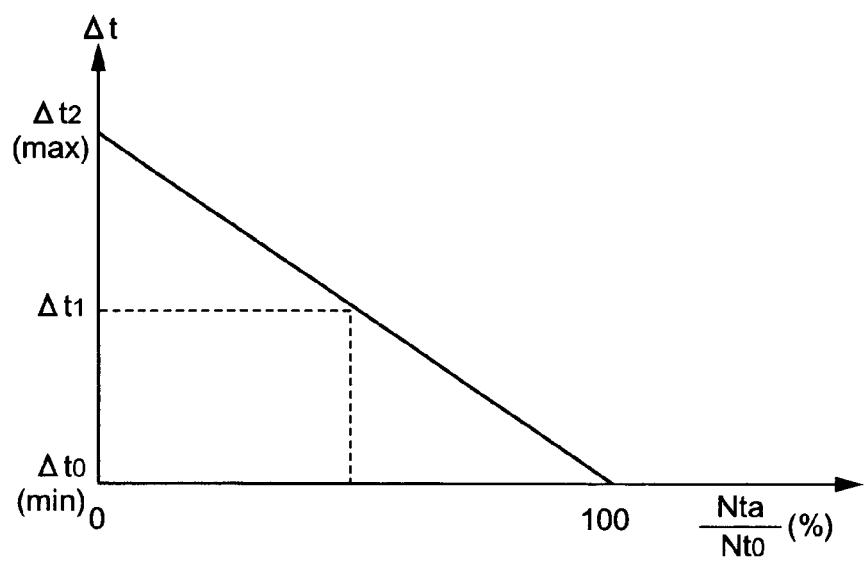
FIGS. 11(a)–11(b) are explanatory diagrams of the waveform control for the inter-electrode current I for the machining electrical power supply device for the wire electrical discharge machining apparatus according to Embodiment 4 of this invention.

Here, α2 is a given constant, β2 and γ2 are constants used for compensation where, immediately after commencing machining or immediately after resetting the count and similar situations, the counter value is 0 or close to 0. For example, where the constant β2=0 and the constant γ2=0, the pulse stretcher range Δt changes, as illustrated in FIG. 11(a), in accordance with the output ratio (Nta/Nto) of the triangular wave against the all-waveforms.

Figure 11B:
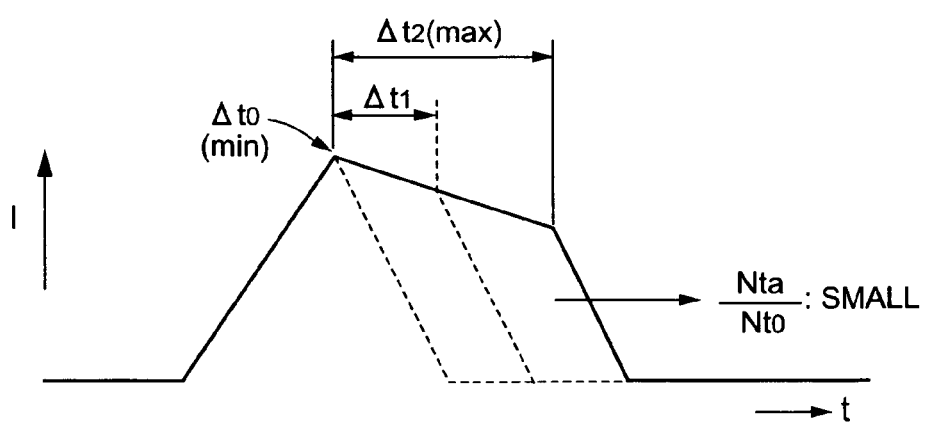

In the pulse stretcher range setting circuit 26, when the proportion of the triangular waves is small, there is little electrical shorting and, even with large power current pulses, the machining state is stable, and so the pulse stretcher range Δt approaches the maximum value Δt (for example, 1 μs); and when the proportion of the triangular waves is large, there is much electrical shorting and the machining state is unstable, and so the pulse stretcher range Δt approaches the minimum value Δt 0 (for example, 0 μs), and the waveform of the inter-electrode current I is controlled as in FIG. 11(b).

In this way, the inter-electrode current waveform control means may be configured so that, when the ratio (Nta/Nto) is small, the pulse width of the trapezoidal wave current that supplies current to the electrodes is made large, and when the ratio (Nta/Nto) is large, the pulse width of the trapezoidal wave current that supplies current to the electrodes is made small.

Embodiment 5

FIG. 12 is a configuration diagram of the machining electrical power supply device for the wire electrical discharge machining apparatus according to Embodiment 5 of this invention. Numerical references identical to FIG. 1 of Embodiment 1, FIG. 8 of Embodiment 3, and FIG. 10 of Embodiment 4 illustrate identical or equivalent parts. In FIG. 12, numerical reference 33 is a signal selection circuit and 34 is a voltage regulator circuit. Two computation circuits 30 and 32 are provided, and the choice as to which of the computation results of these two is used in controlling the waveform is made in the signal selection circuit 33. The signal selection circuit 33 is controlled by commands from the numerical control device 3, and a control method is selected according to machining conditions and the like. The computation result selected in the signal selection circuit 33 is input to the voltage regulator circuit 34, and where, for example, the computation circuit 30 is selected by the signal selection circuit 33, an output voltage Vo of the variable voltage direct current supply V1 is regulated as in the following equation:

$$Vo = K1 \times \{\alpha 1 \times \{Ntz/(Nto+\beta 1)\} + \gamma 1\} \quad (3)$$

Figure 13A:
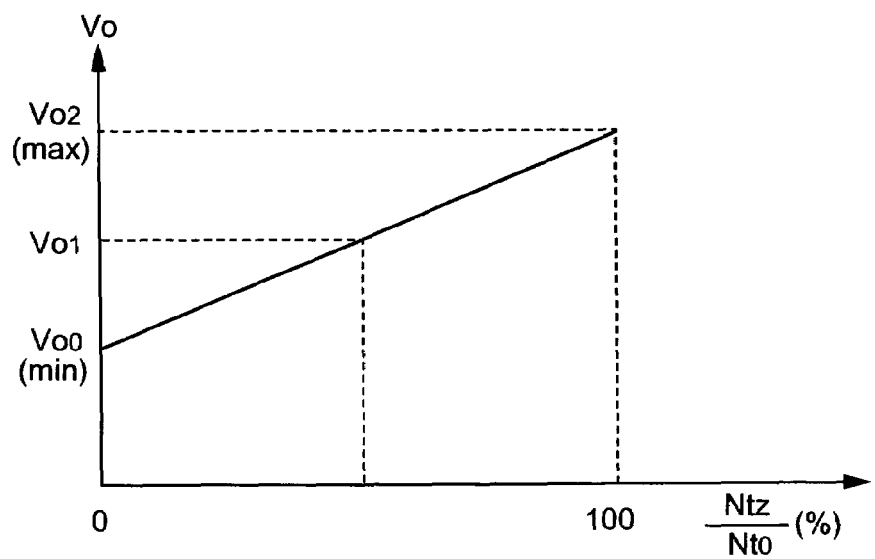
FIGS. 13(a) and 13(b) are explanatory diagrams of the waveform control for the inter-electrode current I for the machining electrical power supply device for the wire electrical discharge machining apparatus according to Embodiment 5 of this invention.

For example, if a constant K1×α1=100V, a constant β1=0, and the constant K1×γ1=150V, the output voltage Vo of the variable voltage direct current power supply V1 changes between the minimum value (Vo0=150 V) and the maximum value (Vo2=250 V) according to the output ratio (Ntz/Nto) of the trapezoidal wave against the all-waveforms, as in FIG. 13(a). That is, when the proportion of the trapezoidal waves is large, there is little electrical shorting and the machining state is stable and so the output voltage Vo approaches the maximum value (Vo2=250V), and conversely, when the proportion of the trapezoidal waves is small, there is much electrical shorting and the machining state is unstable and so the output voltage Vo approaches the minimum value (Vo0=150V).

Figure 13B:
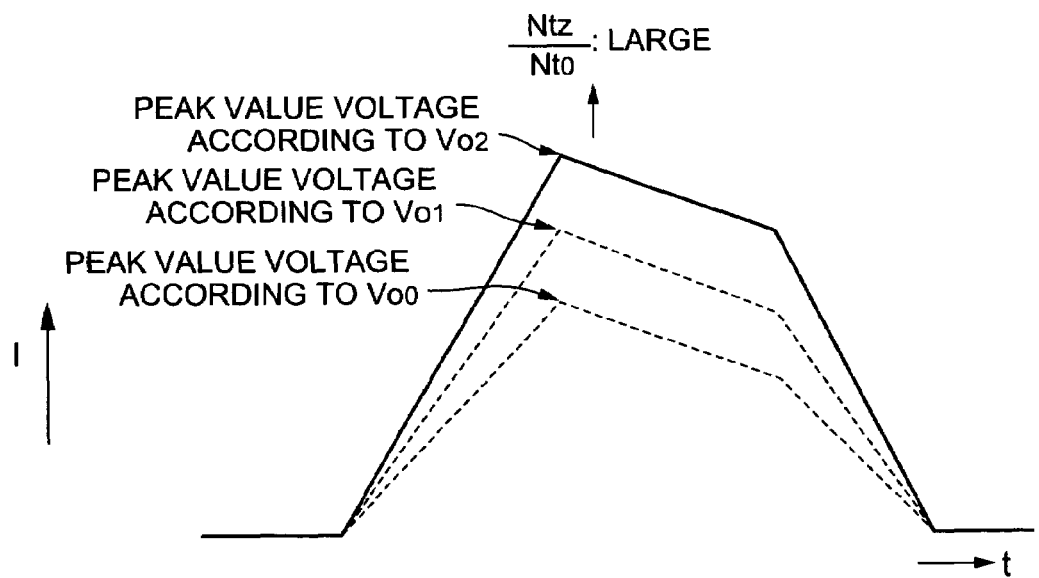

Therefore, the waveform of the inter-electrode current I is controlled as in FIG. 13(b). That is, when the proportion of the trapezoidal waves is large, the output voltage Vo is high, and so, even with the same pulse width, a current waveform with a high peak value is obtained, and when the proportion of the trapezoidal waves is small, the output voltage Vo is low, and so, even with the same pulse width, a current waveform with a low value peak is obtained.

Similarly, where computation circuit 32 is selected by the signal selection circuit 33, when the proportion of the triangular waves is small, the output voltage Vo may be made high, and the inter-electrode peak value may be made high, and when the proportion of the triangular waves is large, the output voltage Vo may be made low, and the inter-electrode peak value may be made low.

In this way, the inter-electrode current waveform control means may be configured: to make large the peak value of the trapezoidal wave current that supplies current to the electrodes, when the ratio (Ntz/Nto) is large or the ratio (Nta/Nto) is small; and to make small the peak value of the trapezoidal wave current that supplies current to the electrodes, when the ratio (Ntz/Nto) is small or the ratio (Nta/Nto) is large.

In this way, while not changing the pulse width of the trapezoidal wave output current waveform, by changing the peak values according to the inter-electrode state, it is possible to control the electrical discharge energy to a value appropriate to the inter-electrode state.

INDUSTRIAL APPLICABILITY

As described above, the machining electrical power supply device for the wire electrical discharge machining apparatus related to this invention is particularly suitable for use in high-productivity wire electrical discharge machining.

What is claimed is:

1. A machining electrical power supply device for a wire electrical discharge machining apparatus that supplies machining electrical power to a wire electrode and a workpiece as electrodes, and machines the workpiece by electrical discharge, the device comprising:

an electrical discharge state distinguishing circuit for distinguishing at least two inter-electrode states including electrical shorting and normal electrical discharge; and an inter-electrode current waveform control means for supplying, and for switching between supply of, a triangular wave and a trapezoidal wave current to the electrodes; wherein according to the inter-electrode state distinguished by the electrical discharge state distinguishing circuit, in cases where the inter-electrode state is that of the electrical shorting, the inter-electrode current waveform control means supplies the triangular wave current to the electrodes; and in cases where the inter-electrode state is that of the normal electrical discharge, the inter-electrode current waveform control means supplies the trapezoidal wave current to the electrodes.

2. The machining electrical power supply device for a wire electrical discharge machining apparatus as set forth in claim 1, further comprising:
 a trapezoidal wave output counting means for counting output count (Ntz) of the trapezoidal wave only; and
 an all-waveforms output counting means for counting all the trapezoidal wave and triangular wave output counts (Nto); wherein
 in cases where the ratio (Ntz/Nto) is large, the inter-electrode current waveform control means increases pulse width of the trapezoidal wave current supplied to the electrodes; and in cases where the ratio (Ntz/Nto) is small, the inter-electrode current waveform control means decreases the pulse width of the trapezoidal wave current supplied to the electrodes.

3. The machining electrical power supply device for a wire electrical discharge machining apparatus as set forth in claim 1, further comprising:
 a triangular wave output counting means for counting output count (Nta) of the triangular wave only; and
 an all-waveforms output counting means for counting all the trapezoidal wave and the triangular wave output counts (Nto);
 wherein in cases where the ratio (Nta/Nto) is small, the inter-electrode current waveform control means increases pulse width of the trapezoidal wave current supplied to the electrodes; and
 in cases where the ratio (Nta/Nto) is large, the inter-electrode current waveform control means decreases pulse width of the trapezoidal wave current supplied to the electrodes.

4. The machining electrical power supply device for a wire electrical discharge machining apparatus as set forth in claim 1, further comprising:
 a trapezoidal wave output counting means for counting the trapezoidal wave output count (Ntz) only; and
 an all-waveforms output counting means for counting all the triangular wave and the trapezoidal wave output counts (Nto); wherein
 in cases where the ratio (Ntz/Nto) is large, the inter-electrode current waveform control means increases the peak value of the trapezoidal wave current supplied to the electrodes; and
 in cases where the ratio (Ntz/Nto) is small, the inter-electrode current waveform control means decreases the peak value of the trapezoidal wave current supplied to the electrodes.

5. The machining electrical power supply device for a wire electrical discharge machining apparatus as set forth in claim 1, further comprising:
 a triangular wave output counting means for counting the triangular wave output count (Nta) only; and
 an all-waveforms output counting means for counting all the trapezoidal wave and the triangular wave output counts (Nto); wherein in cases where the ratio (Nta/Nto) is small, the inter-electrode current waveform control means increases the peak value of the trapezoidal wave current supplied to the electrodes; and
 in cases where the ratio (Nta/Nto) is large, the inter-electrode current waveform control means decreases the peak value of the trapezoidal wave current supplied to the electrodes.

6. A machining electrical power supply device for a wire electrical discharge machining apparatus that supplies machining electrical power to a wire electrode and a workpiece as electrodes, and machines the workpiece by electrical discharge, the device comprising:
 an electrical discharge state distinguishing circuit for distinguishing electrical shorting, instantaneous electrical discharge, and normal electrical discharge states between the electrodes; and
 an inter-electrode current waveform control means for supplying, and for switching between supply of, a triangular wave and a trapezoidal wave current to the electrodes; wherein
 according to the inter-electrode state distinguished by the electrical discharge state distinguishing circuit, in cases where the inter-electrode state is that of the electrical shorting, the inter-electrode current waveform control means supplies the triangular wave current to the electrodes; in cases where the inter-electrode state is that of the normal electrical discharge, the inter-electrode current waveform control means supplies the trapezoidal wave current to the electrodes; and in cases where the inter-electrode state is that of the instantaneous electrical discharge, the inter-electrode current waveform control means supplies the triangular wave or the trapezoidal wave current to the electrodes.

7. The machining electrical power supply device for a wire electrical discharge machining apparatus as set forth in claim 6, further comprising:
 a trapezoidal wave output counting means for counting output count (Ntz) of the trapezoidal wave only; and
 an all-waveforms output counting means for counting all the trapezoidal wave and triangular wave output counts (Nto);
 wherein in cases where the ratio (Ntz/Nto) is large, the inter-electrode current waveform control means increases pulse width of the trapezoidal wave current supplied to the electrodes; and
 in cases where the ratio (Ntz/Nto) is small, the inter-electrode current waveform control means decreases the pulse width of the trapezoidal wave current supplied to the electrodes.

8. The machining electrical power supply device for a wire electrical discharge machining apparatus as set forth in claim 6, further comprising:
 a triangular wave output counting means for counting output count (Nta) of the triangular wave only; and
 an all-waveforms output counting means for counting all the trapezoidal wave and the triangular wave output counts (Nto); wherein in cases where the ratio (Nta/Nto) is small, the inter-electrode current waveform control means increases pulse width of the trapezoidal wave current supplied to the electrodes; and
 in cases where the ratio (Nta/Nto) is large, the inter-electrode current waveform control means decreases pulse width of the trapezoidal wave current supplied to the electrodes.

9. The machining electrical power supply device for a wire electrical discharge machining apparatus as set forth in claim 6, further comprising:
 a trapezoidal wave output counting means for counting the trapezoidal wave output count (Ntz) only; and
 an all-waveforms output counting means for counting all the triangular wave and the trapezoidal wave output counts (Nto); wherein
 in cases where the ratio (Ntz/Nto) is large, the inter-electrode current waveform control means increases the peak value of the trapezoidal wave current supplied to the electrodes; and in cases where the ratio (Ntz/Nto) is small, the inter-electrode current waveform control means decreases the peak value of the trapezoidal wave current supplied to the electrodes.

10. The machining electrical power supply device for a wire electrical discharge machining apparatus as set forth in claim 6, further comprising:
   a triangular wave output counting means for counting the triangular wave output count (Nta) only; and
   an all-waveforms output counting means for counting all the trapezoidal wave and the triangular wave output counts (Nto); wherein in cases where the ratio (Nta/Nto) is small, the inter-electrode current waveform control means increases the peak value of the trapezoidal wave current supplied to the electrodes; and
   in cases where the ratio (Nta/Nto) is large, the inter-electrode current waveform control means decreases the peak value of the trapezoidal wave current supplied to the electrodes.

11. An electrical power supplying method for a wire electrical discharge machining apparatus that supplies machining electrical power to a wire electrode and a workpiece as electrodes, and machines the workpiece by electrical discharge, comprising of steps of:
   distinguishing at least two inter-electrode states including electrical shorting and normal electrical discharge; and
   switching between supplying a triangular wave and a trapezoidal wave current to the electrodes,
   wherein the triangular wave current is supplied to the electrodes in cases where the inter-electrode state is the electrical shorting, and the trapezoidal wave current is supplied to the electrodes in cases where the inter-electrode state is the normal electrical discharge, in accordance with the interelectrode state distinguished.

* * * * *